July 31, 1962   A. SEARLES   3,047,133
CONVEYOR BELT CLEANER
Filed Jan. 10, 1961   2 Sheets-Sheet 1
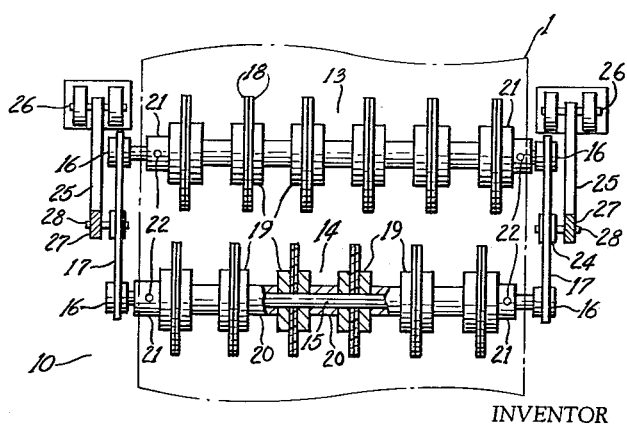
INVENTOR
Amos Searles
BY
ATTORNEY July 31, 1962   A. SEARLES   3,047,133
CONVEYOR BELT CLEANER
Filed Jan. 10, 1961   2 Sheets-Sheet 2

INVENTOR
Amos Searles
BY Jack Schu—
ATTORNEY

United States Patent Office 3,047,133
Patented July 31, 1962

3,047,133
CONVEYOR BELT CLEANER
Amos Searles, 643 Adams St., Scranton, Pa.
Filed Jan. 10, 1961, Ser. No. 81,739
15 Claims. (Cl. 198—230)

This invention relates broadly to the field of conveyor belts, and specifically to a conveyor belt cleaner which may be used alone or in combination with conveyor belt idler rolls.

Briefly, the invention comprises a plurality of pairs of resilient discs held together by backing discs of smaller diameter, which resilient discs are mounted for rotation on a shaft and which are so urged towards engagement with the conveyor belt that the said resilient discs spread apart from each other beyond the diameters of their respective backing discs, thus presenting rotating circular segments to the face of the conveyor belt and thereby effecting the desired cleaning action.

One of the objects of this invention is to provide a conveyor belt cleaner effective to remove adherent fine material from the face of the return stretch of the conveyor belt after the latter has discharged at the loading point, and to prevent the formation of ice that would otherwise interfere with and divert the belt.

Another object of this invention is to provide a conveyor belt cleaner effective as indicated in the paragraph immediately above and which also may serve as a means of support for the return stretch of the conveyor belt that functioning also as a return idler roll.

Yet another object of this invention is to provide apparatus as above-mentioned wherein wearing parts may be easily and readily replaced, and the weight and wear of the several parts of the said apparatus are reduced.

Still other and further objects will become apparent during the course of the following description.

Referring now to the drawings, in which like numerals represent like parts in the several views:

FIG. 1 represents a diagrammatic view in side elevation of a complete conveyor belt installation, and shows two alternative positions of the belt cleaning apparatus.

FIG. 2 represents an enlarged diagrammatic view of one end of the conveyor belt system of FIG. 1, and shows in more detail a side elevation of the belt cleaning apparatus, the latter being placed in this embodiment between the conventional head pulley and snub pulley.

FIG. 3 represents an enlarged view of the belt cleaning apparatus taken along the line 3—3 of FIG. 2, partly broken away to show certain details.

Figure 4:
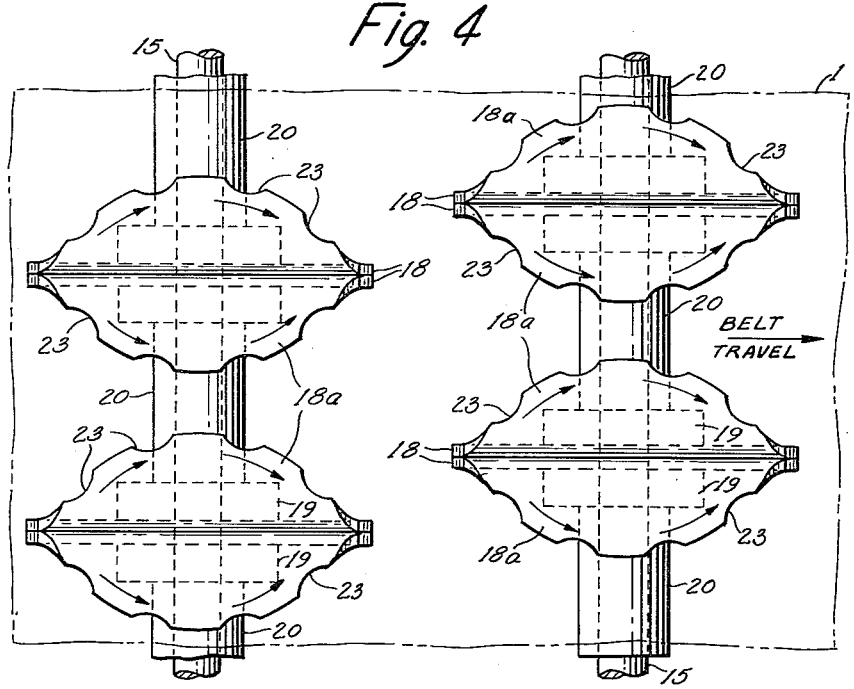
FIG. 4 represents an enlarged view in plan, showing four of the resilient discs spread out in engagement with the conveyor belt and indicating by arrows the relative motion (and hence the cleaning action) between said resilient discs and the conveyor belt.
Figure 5:
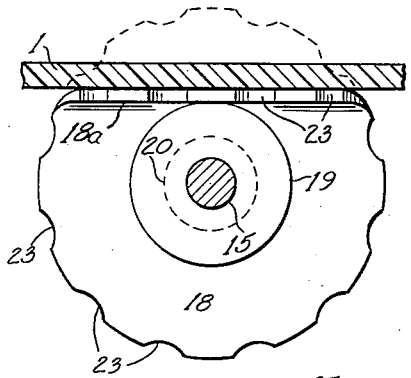
FIG. 5 represents an enlarged side elevation of one of the cleaning units in position against the conveyor belt, showing in solid lines the resilient discs as they appear in operation, and showing in phantom the position of said resilient discs if the cleaning unit were not engaged with the conveyor belt.

A conventional conveyor belt installation as shown in FIG. 1 may comprise conveyor belt 1, head pulleys 2 and 3 at loading end 4 and discharge end 5 respectively, snub pulleys 6 and 7, troughing load bearing idler rolls 8 and return idler rolls 9. The means for driving this system are well-known, and are therefore not illustrated.

The belt cleaning apparatus 10 of this invention may be placed at 11 or 12 as shown in FIG. 1, or in any other equivalent position.

Belt cleaning apparatus 10 comprises belt cleaning sub-assemblies 13 and 14. Each of said sub-assemblies 13 and 14 comprises shaft 15 rotatably mounted in bearings 16 fixed in arms 17. Resilient discs 18, held together in axially restrained relation by backing discs 19, are mounted in pairs on shaft 15, said pairs being suitably spaced from each other by means of spacing sleeves 20. End collars 21, held to shaft 15 by means of set screws 22 or the equivalent, maintain all of the pairs of resilient discs 18 and backing discs 19 and spacing sleeves 20 in position on the said shaft 15.

Figure 6:
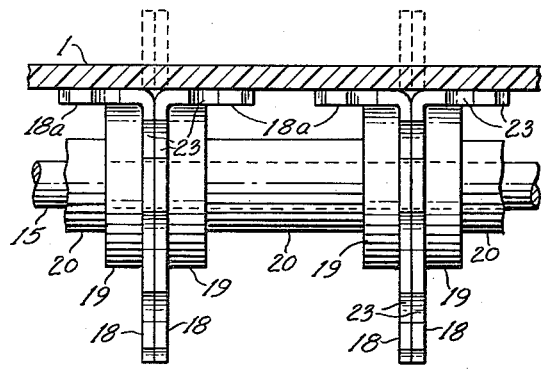
FIG. 6 represents an enlarged front elevation of two adjacent cleaning units in position against the conveyor belt, showing in solid lines the resilient discs spread apart between the backing discs and the conveyor belt, and showing in phantom the position of said resilient discs if the cleaning unit were not engaged with the conveyor belt.

It will be noted that the thickness of resilient discs 18 considerably less than the outer unrestrained deformable portions of said discs 18 (viz., the thickness of said discs 18 is considerably less than the difference between the radii of discs 18 and the radii of discs 19). As resilient discs 18 are rotatably mounted, and as they are urged towards the face of conveyor belt 1 by means to be described, the said discs 18 will deflect segmentally at the outer unrestrained portions thereof as shown in FIG. 6. Rotation of discs 18 is effected by the frictional contact of the linearly moving conveyor belt 1 with the deflected segments 18a of said discs 18.

It will be apparent from FIG. 4 that the locus of a point on the deflected segment 18a of each disc 18 is an arc, as indicated by the curved arrows, and thus there is relative motion between said deflected segments 18a and the conveyor belt 1 lengthwise and crosswise of the said belt 1. Such relative motion provides a sweeping cleaning action which is effective to remove foreign matter from the face of the belt 1. Additionally, the periphery of each deflected segment 18a engages foreign matter on the surface of belt 1 and dislodges the same by centrifugal action so that the aforesaid foreign matter is discharged tangentially of the deflected segments 18a.

To develop the maximum engagement and centrifugal discharge of foreign matter, and particularly of fines, the peripheries of discs 18 may be provided with flutes or notches 23. Such flutes or notches 23 permit more positive contact with foreign matter to more effectively drive the latter free from belt 1.

Practice has demonstrated that two resilient discs 18 as described deflect in rotation under peripheral pressure in sustained directions, viz., outwardly from each other as being the direction of least resistance, regardless of any irregular static deflection under pressure prior to the commencement of rotation.

Generally speaking, each of the sub-assemblies 13 and 14 will not clean the entire surface of belt 1, and therefore will not constitute a complete cleaning unit, because of the spacing between deflected segments 18a of adjacent pairs of resilient discs 18, which spacing permits the escape of dislodged foreign matter, and because of the spaces formed between the bend radii of the two resilient discs 18 of each pair. For the purpose of cleaning the entire surface of belt 1, two such sub-assemblies 13 and 14 are required, the resilient discs 18 of one of said sub-assemblies being axially offset from the resilient discs 18 of the other sub-assembly, so that each sub-assembly will clean areas of belt 1 not contacted by the other sub-assembly.

For the most effective operation, a considerable peripheral centrifugal effect is desirable. It will be apparent that the lineal velocity of resilient discs 18 at the point where they are bent over backing discs 19 is equal to the lineal velocity of belt 1, assuming no relative slippage in this area. It will be further apparent that the peripheral velocity of resilient discs 18 will be equal to the linear velocity of said resilient discs 18 where they bend over backing discs 19 multiplied by the ratio of the diameter of resilient discs 18 to the diameter of backing discs 19 plus twice the thickness of resilient discs 18. Therefore, the centrifugal cleaning effect is promoted by small diameter backing discs 19.

Pressure is required to urge cleaning assembly 10 into operative engagement with belt 1.

When cleaning unit 10 is placed in position 11 so that it replaces at such position a conventional return idler roll 9, the weight of belt 1 may be sufficient to provide the required operating pressure. In this embodiment, arms 17 may be suitably pivotally mounted at central portions 24 to the supporting structure of the conveyor to thereby equalize the operating pressures of the two sub-assemblies 13 and 14.

When cleaning unit 10 is placed in position 12, the required operating pressure may be supplied by the system of levers and springs shown in FIG. 2. Thus, at each side of cleaning unit 10, link 25, pivoted as at 26 to the supporting structure of the conveyor, is provided with arm 27 pivoted to central portion 24 of arm 17 by means of pin 28. Lever 29, pivoted at 30 to the supporting structure of the conveyor, is pinned at one end as at 31 to arm 32 connected to arm 27, and the other end of said lever 29 is urged downwardly by means of spring 33 secured to the supporting structure of the conveyor. In this manner, cleaning unit 10 is urged against belt 1, belt 1 operatively engages backing discs 19 through deflected segments 18a thereby causing said backing discs 19 and resilient discs 18 to rotate (the peripheral velocity of said resilient discs 18 and deflected segments 18a being considerably greater than the peripheral velocity of said backing discs 19 as explained before) and the operating pressures of sub-assemblies 13 and 14 are equalized. In place of spring 33, a suitable weight may be used. Further, any other equivalent means may be used in place of the arrangement shown to urge cleaning unit 10 against belt 1.

Figure 7:
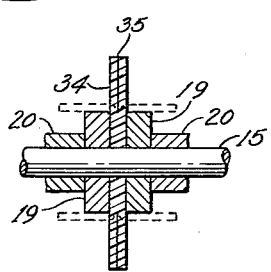
FIG. 7 represents an enlarged section in elevation of a modification of the active element of the cleaning apparatus.

The modification shown in FIG. 7 is directed to a single resilient disc 34 provided with a circumferential slot 35 which extends inwardly to at least the diameter of backing discs 19. This resilient disc 34, which may be provided with peripheral flutes or notches 23, is used in sub-assemblies 13 and 14 in place of the pairs of resilient discs 18, and otherwise operates in the same manner.

While I have shown the best embodiment of my invention known to me, I do not wish to be limited to the exact structure shown and described but may use such modifications or equivalents thereof as are embraced within the scope of the specification and drawings or as pointed out by the claims.

I claim:

1. Apparatus for cleaning a moving conveyor belt, comprising rotatable disc means, an outer resilient portion on said disc means, an inner relatively non-resilient portion on said disc means, and means urging said disc means and conveyor belt into engagement to deflect said outer resilient portion, said outer resilient portion presenting a substantially flat circular segment in wiping engagement with said conveyor belt and rotating in a plane parallel to the plane of that portion of the conveyor belt being cleaned.

2. Apparatus for cleaning a moving conveyor belt, comprising rotatable disc means, an outer resilient portion on said disc means, an inner relatively non-resilient portion on said disc means, and means urging said disc means and conveyor belt into frictional engagement, said last-mentioned means deflecting segments of said outer resilient portion against said conveyor belt between said conveyor belt and said inner relatively non-resilient portion, said outer resilient portion presenting a substantially flat circular segment in wiping engagement with said conveyor belt and rotating in a plane parallel to the plane of that portion of the conveyor belt being cleaned.

3. Apparatus for cleaning a moving conveyor belt, comprising substantially flat disc means rotatably mounted on an axis, an outer resilient axially unrestrained portion on said disc means, an inner axially restrained portion on said disc means, and means urging said disc means and conveyor belt into frictional engagement, said last-mentioned means deflecting segments of said outer unrestrained portion against said conveyor belt between said conveyor belt and the inner axially restrained portion of said disc means and maintaining such segments of said outer unrestrained portion in wiping engagement with said conveyor belt, said last-mentioned means further maintaining said inner axially restrained portion of said disc means in operative engagement with said conveyor belt.

4. Apparatus for cleaning a moving conveyor belt, comprising first and second disc means rotatable on a common axis, outer resilient portions and inner relatively non-resilient portions on said first and second disc means, third means holding said first and second disc means against each other, and fourth means urging said first and second disc means and said conveyor belt into frictional engagement, said fourth means deflecting segments of said outer resilient portions of said first and second disc means away from each other and against the conveyor belt.

5. Apparatus for cleaning a moving conveyor belt, comprising first and second disc means rotatable on a common axis, outer unrestrained resilient portions and inner axially restrained portions on said first and second disc means, and third means urging said first and second disc means and said conveyor belt into frictional engagement, said third means deflecting segments of said outer unrestrained portions of said first and second disc means away from each other and against said conveyor belt, said third means further maintaining said inner axially restrained portions of said first and second disc means in operative engagement with said conveyor belt.

6. Apparatus for cleaning a moving conveyor belt, comprising first and second resilient discs adjacent each other, first and second relatively non-resilient backing discs adjacent said first and second resilient discs respectively and of smaller diameter than said first and second resilient discs respectively, said first and second resilient discs and backing discs being arranged for rotation on a common axis, and means urging said first and second resilient discs and said conveyor belt into frictional engagement, said last-mentioned means deflecting segments of said first and second resilient discs away from each other and against said conveyor belt.

7. Apparatus as in claim 6, further including a plurality of notches in the periphery of said first and second resilient discs.

8. Apparatus for cleaning a moving conveyor belt, comprising first and second resilient discs adjacent each other, first and second relatively non-resilient backing discs adjacent said first and second resilient discs respectively and of smaller diameter than said first and second resilient discs respectively, said first and second resilient discs and backing discs being arranged for rotation on a common axis, and means urging said first and second resilient discs and said conveyor belt into frictional engagement, said last-mentioned means deflecting segments of said first and second resilient discs extending beyond said backing discs away from each other and against said conveyor belt between said conveyor belt and their respective backing discs, said last-mentioned means further maintaining said first and second backing discs in operative engagement with said conveyor belt.

9. Apparatus as in claim 8, further including a plurality of notches in the periphery of said first and second resilient discs.

10. Apparatus for cleaning a moving conveyor belt, comprising a resilient disc, backing discs adjacent both sides of said resilient disc and of smaller diameter than said resilient disc, said resilient disc and said backing discs being arranged for rotation on a common axis, a circumferential slot in said resilient disc extending inwardly from the periphery thereof to the diameter of said backing discs and defining first and second unrestrained resilient portions on said resilient disc, and means urging said resilient disc and conveyor belt into frictional engagement, said last-mentioned means deflecting said first and second resilient portions away from each other and against said conveyor belt.

11. Apparatus as in claim 10, further including a plurality of notches in the periphery of said first and second resilient portions.

12. Apparatus for cleaning a moving conveyor belt, comprising a resilient disc, backing discs adjacent both sides of said resilient disc and of smaller diameter than said resilient disc, said resilient disc and said backing discs being arranged for rotation on a common axis, a circumferential slot in said resilient disc extending inwardly from the periphery thereof to the diameter of said backing discs and defining first and second unrestrained resilient portions on said resilient disc, and means urging said resilient disc and conveyor belt into frictional engagement, said last-mentioned means deflecting said first and second resilient portions away from each other and against said conveyor belt between said conveyor belt and their respective backing discs, said last-mentioned means further maintaining said backing discs in operative engagement with said conveyor belt.

13. Apparatus for cleaning a moving conveyor belt, comprising first and second sub-assemblies, each sub-assembly comprising a plurality of spaced pairs of first and second resilient discs and first and second backing discs of smaller diameter than said resilient discs, each pair of resilient discs being arranged between a pair of backing discs, all of said resilient discs and backing discs of each sub-assembly being arranged for rotation on a common axis, and means urging said resilient discs and conveyor belt into frictional engagement, said last-mentioned means deflecting segments of the first and second resilient discs of each pair away from each other and against said conveyor belt, the pairs of resilient discs of the second sub-assembly being staggered laterally with respect to the pairs of resilient discs of the first sub-assembly.

14. Apparatus for cleaning a moving conveyor belt, comprising first and second sub-assemblies, each sub-assembly comprising a plurality of spaced pairs of first and second resilient discs and first and second backing discs of smaller diameter than said resilient discs, each pair of resilient discs being arranged between a pair of backing discs, all of said backing discs and resilient discs of each sub-assembly being arranged for rotation on a common axis, and means urging said resilient discs and conveyor belt into frictional engagement, said last-mentioned means deflecting segments of the first and second resilient discs of each pair away from each other and against said conveyor belt between said conveyor belt and their respective backing discs, said last-mentioned means further maintaining said backing discs in operative engagement with said conveyor belt, the pairs of resilient discs of the second sub-assembly being staggered laterally with respect to the pairs of resilient discs of the first sub-assembly.

15. Apparatus for cleaning a moving conveyor belt, comprising first and second sub-assemblies, each sub-assembly comprising a plurality of spaced resilient discs, backing discs adjacent both sides of each resilient disc and of smaller diameter than said resilient discs, all of said resilient discs and backing discs of each sub-assembly being arranged for rotation on a common axis, a circumferential slot in each resilient disc extending inwardly from the periphery thereof to the diameter of the backing discs and defining first and second unrestrained resilient portions on each resilient disc, and means urging said resilient discs and conveyor belt into frictional engagement, said last-mentioned means deflecting said first and second resilient portions of each resilient disc away from each other and against the conveyor belt between the conveyor belt and their respective backing discs, said last-mentioned means further maintaining said backing discs in operative engagement with said conveyor belt, the resilient discs of the second sub-assembly being staggered laterally with respect to the resilient discs of the first sub-assembly.

References Cited in the file of this patent

UNITED STATES PATENTS

| | | |
|---|---|---|
| 1,776,419 | Dodge | Sept. 23, 1930 |
| 2,514,780 | McGovern | July 11, 1950 |
| 2,592,581 | Lorig | Apr. 15, 1952 |
| 2,644,575 | Mercier | July 7, 1953 |